No. 793,544. PATENTED JUNE 27, 1905.
W. SCHWARZ.
APPARATUS FOR PURIFYING BLAST FURNACE GASES.
APPLICATION FILED JAN. 28, 1905.

WITNESSES
H. Lee Helms
E. G. Fullam

INVENTOR
Walter Schwarz
By Macullen Bailey
HIS ATTORNEY

No. 793,544.

Patented June 27, 1905.

UNITED STATES PATENT OFFICE.

WALTER SCHWARZ, OF DORTMUND, GERMANY.

APPARATUS FOR PURIFYING BLAST-FURNACE GASES.

SPECIFICATION forming part of Letters Patent No. 793,544, dated June 27, 1905.

Application filed January 28, 1905. Serial No. 243,067.

*To all whom it may concern:*

Be it known that I, WALTER SCHWARZ, of Dortmund, Kingdom of Prussia, German Empire, (whose post-office address is No. 72 Friedenstrasse, Dortmund, aforesaid,) have invented certain new and useful Improvements in Apparatus for Purifying Blast-Furnace Gases, of which the following is a specification.

My invention has relation to that class of blast-furnace gas-purifiers in which water and centrifugal force are used for the purposes of eliminating from blast-furnace gases dust particles and other impurities which are unavoidably carried off from the furnaces or other sources of said gases.

From purifier types as constructed for the same or similar purpose by other inventors and makers the purifier embodying my invention is distinguished by such particular construction, form, and combination of its elements that all single effects producing the total purifying efficiency are exclusively transferred and confined to the periphery— *i. e.*, to annular spaces contiguous to the internal surface of a stationary casing which forms a main part of the purifier and has an essentially cylindro-conical form. Realizing in principle such peripherical function I employ constructive means distinguished by great simplicity, not containing intricate or labyrinthical ways subject to rapid obstruction, and much increasing the efficiency as well of the humectation and penetration of the dust particles by the purifying-water as of the separation of the moistened dust particles from the purified gas. A new controlling device is combined with the said new features of a purifier which is capable not only of increasing or diminishing the quantitative efficiency, but also acts directly upon the purifying power of the washer and does not comprise any internal members, the conical drum and the corresponding portion of the casing acting themselves as regulating means and all adjusting means being externally arranged and movable from the outside. Thus in general not only perfect efficiency of the improved purifier is realized, but also considerable economy in driving power, purifying-water, and time is obtained, and interruptions of continuous working hitherto caused by frequent cleansing and repairing or unmounting operations are dispensed with.

In the accompanying drawings like letters refer to the same parts.

Figure 1:
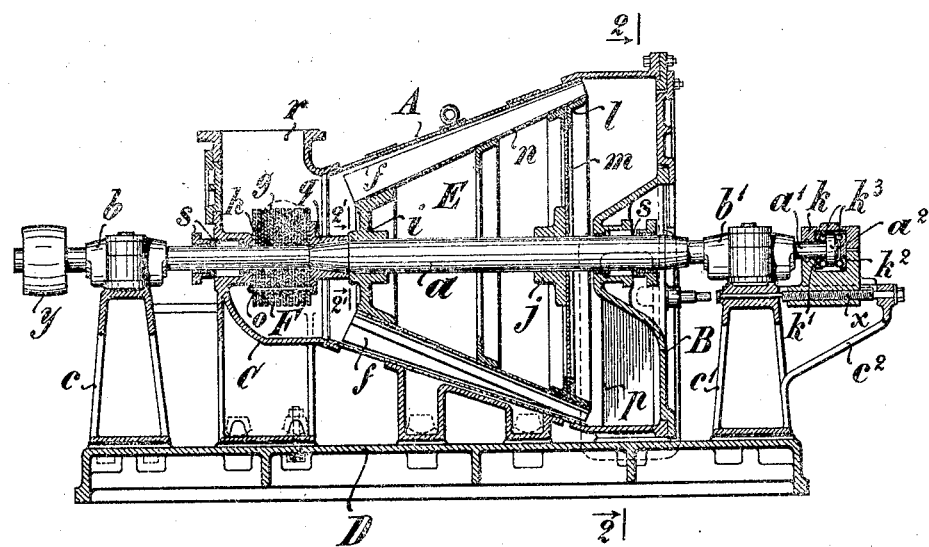
Figure 2:
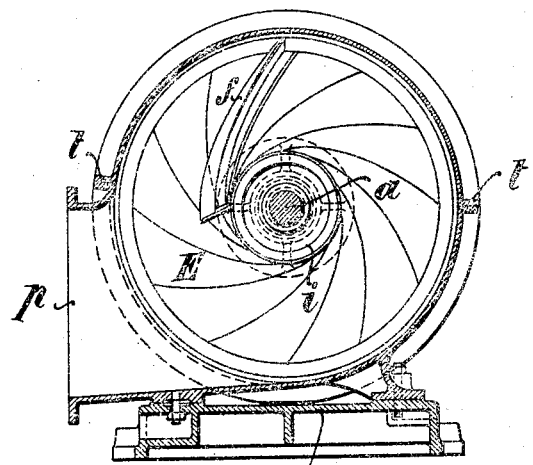

Figure 1 is a vertical axial section of the apparatus. Fig. 2 is a transverse section of the same, following in general the line 2 2 in Fig. 1 and viewed in the direction of the arrow $z$ in this figure, the interior parts being fully represented as to be seen behind the section-line 2 2.

In the apparatus shown on the drawings, $a$ is a shaft horizontally supported in bearings $b\ b'$, fixed upon brackets $c\ c'$, which are connected to a base-plate $d$, so as to permit easy removal of one of the same, $c'$, which is on the right-hand side of the drawings.

On the shaft $a$ a conical drum E is formed by means of the head parts $i\ j\ m\ l$, keyed upon said shaft $a$, and of a conical truncated mantle $n$, connected to said head parts and fitted with helicoidal flights $f$. In front of this drum E a dispersing member F is preferably formed by a series of thin metal disks $g$, held at convenient distance from each other by washers $h$ or like spacing means, these conjugated parts being preferably engaged upon the shaft $a$ with central borings and kept in place by being connected with bolts $o$ to the flange of a sleeve $q$, engaged upon a conical part of the shaft $a$.

A casing is rigidly fixed to the base-plate and is constituted by a conical part A, corresponding to the taper of the drum E, having a cover B bolted to it and provided with an outlet $p$, and by an essentially cylindrical part C, surrounding the dispersing member F and provided with an inlet-opening $r$.

$s$ represents stuffing-boxes on the end parts B and C of the casing, through which the shaft $a$ is passed.

As shown in Fig. 2, the conical portion of the casing A is formed in two parts provided with flanges $t$, which are shown in Fig. 2 and which may be connected together by bolts or other means. Such division of the casing part A considerably facilitates access to the interior of the casing for cleansing, repairing, and other purposes, especially when the cover B is taken off. The bracket $c'$ on the right-hand side is provided with a projection $c^2$, on which a supplementary bearing $k$ is mounted between lateral guideways, so that it moves toward or from the opposite main bearing $b'$ when a screw-spindle $x$, engaging a threaded hole in the base of said bearing, is turned without axial displacement in correspondingly-arranged bearing portions of the parts $c'$ and $c^2$. The end $a'$ of the main shaft $a$, provided with a collar $a^2$, enters into the interior of the attachment-bearing $k$ and is held therein, so that it is free to rotate with the whole shaft $a$, being prevented, however, from axial movement independent from the shifting movement, which can be imparted to the bearing $k$ by turning the screw $x$ with a wrench or like instrument engaged upon the right hexagonal head of the said screw $x$. The shifting movement thus produced is transmitted to the before-mentioned end collar $a^2$ by means of the step-disk $k^2$ and the counter-washer $k'$, which two parts, with balls $k^3$, held in convenient circular grooves, are applied against the collar $a^2$, abutting with their outer surfaces against the opposite internal faces of the bearing $k$.

It is understood that the described shifting and adjusting device may be substituted by any other effecting the sectional enlargement or reduction of the annular passage between the drum E and the conical casing A, such effect being produced, for instance, by pointed screws abutting the two end faces of the shaft $a$, held in convenient threaded bracket projections and provided with hexagonal heads and locking-nuts. As compared with such other devices the construction shown on the drawings has the advantage not to obstruct the left end of the shaft $a$, projecting beyond the bearing $b$, which is left free in consequence for placing a pulley $y$ and putting thereon or removing therefrom the main driving-belt of the apparatus.

The operation of the purifying apparatus described in the foregoing is the following: The high furnace-gas to be purified entering into elbow $r$ with a certain progressive velocity by the aspirating action of the rapidly-rotating drum E, acting in this regard like a fan-wheel, at first meets the finely-divided water particles contained in the series of consecutive veils produced by the rotating dispersing member $g$ and filling the total annular sectional surface of the corresponding zone C of the casing. Passing through such plurality of veils the gas is moistened throughout, because in the direction of the transversal extent of the water veils no interstices are left through which particles of the crude gas might pass. Notwithstanding this, only an insignificant amount of resistance is exercised by the water-veil series, owing to the perfect state of disaggregation, and therefore the advancing movement of the gas stream is not sensibly impeded. In this state of perfect humectation the gas is sucked up by the drum E, which, having an entirely-closed shell exercising only a peripherical action and not containing hollow spaces retaining the moistened dust, projects the moistened dust against the stationary wall of the conical casing $d$, simultaneously effecting the penetration of the dust with water particles. Such action of the drum of course is always combined with the continuous aspiration of the gas, the crude as well as that which is in course of purification, and with the separation of the purified gas from the water charging itself with the dust, so that at the outlet $p$ there is continuous escape of the two fluids, of which one, the purified gas, may be dried, if necessary, in a drying or separating apparatus.

The regulation of the quantitative efficiency of the purifier may be effected in a very simple manner by the use of valves or similar organs controlling the crude-gas or purifying-water supply. However, the described regulation effected by longitudinally shifting the conical drum E, with its shaft, has the advantage that, together with the quantitative efficiency, the purifying power of the new apparatus is varied inasmuch as the optional reduction of the sectional area of the annular conical space between the drum E and the stationary casing $d$ considerably increases the efficiency of the drum E.

What I claim is—

1. In an apparatus for purifying blast-furnace gases the combination with a stationary casing, of a rapidly-rotating conical drum and a dispersing member, both rotating within the said casing about a common axis, substantially as and for the purpose described.

2. In an apparatus for purifying blast-furnace gases the combination with a substantially cylindro-conical casing, having at opposite ends an inlet and outlet, of a conical drum consisting of a closed truncated shell fitted on its outer surface with blades or flights and a dispersing member coöperating with said drum, substantially as and for the purpose described.

3. In an apparatus for purifying blast-furnace gases the combination with a casing of a conical rapidly-rotating drum and a dispersing member consisting in a plurality of metal or other disks separated by washers and adapted to produce a water veil within the casing through which no gas particles can pass without being moistened, substantially as and for the purpose described.

4. In an apparatus for purifying blast-furnace gas the combination with a casing of a rapidly-rotating conical drum coacting with a dispersing member and a controlling device adapted to displace in axial direction the conical drum within the conical casing for the purpose of regulating the purifying efficiency of the apparatus, substantially as and for the purpose described.

5. In an apparatus for purifying blast-furnace gas the combination with a casing of a rapidly-rotating conical drum coacting with a dispersing member and a controlling device consisting of means for shifting the shaft carrying the conical drum from the outside of the casing, substantially as and for the purpose described.

6. In an apparatus for purifying blast-furnace gas the combination with a casing of a rapidly-rotating conical drum coacting with a dispersing member and a controlling device consisting of a shaft-carrying bracket attachment rotatingly holding between collars one end of the drum-shaft and slidingly mounted on a bracket projection to allow of longitudinal shifting the drum-shaft, substantially as and for the purpose described.

7. In an apparatus for purifying blast-furnace gases the combination of a conical casing with a peripherically-acting conical centrifugal drum and a dispersing member coacting therewith, the conical casing being constructed in two parts secured together for the purpose of allowing the apparatus to be easily cleansed, substantially as and for the purpose described.

In testimony whereof I have hereunto set my hand in presence of two subscribing witnesses.

WALTER SCHWARZ.

Witnesses:
HARRY L. MEFFORD,
Frau E. PFUDEL.